(12) United States Patent
Lopatin et al.

(10) Patent No.: US 12,203,888 B2
(45) Date of Patent: Jan. 21, 2025

(54) VIBRONIC MULITSENSOR

(71) Applicant: Endress+Hauser SE+Co. KG, Maulburg (DE)

(72) Inventors: Sergey Lopatin, Lörrach (DE); Jan Schleiferböck, Rümmingen (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 232 days.

(21) Appl. No.: 17/907,808

(22) PCT Filed: Jan. 28, 2021

(86) PCT No.: PCT/EP2021/052001
§ 371 (c)(1),
(2) Date: Aug. 29, 2022

(87) PCT Pub. No.: WO2021/170339
PCT Pub. Date: Sep. 2, 2021

(65) Prior Publication Data
US 2023/0100159 A1 Mar. 30, 2023

(30) Foreign Application Priority Data
Feb. 27, 2020 (DE) ............... 10 2020 105 214.6

(51) Int. Cl.
*G01N 29/02* (2006.01)
*G01F 23/296* (2022.01)
(Continued)

(52) U.S. Cl.
CPC ......... *G01N 29/024* (2013.01); *G01F 23/296* (2013.01); *G01K 7/02* (2013.01);
(Continued)

(58) Field of Classification Search
CPC .. G01N 29/024; G01N 9/002; G01N 29/2437; G01N 29/4436; G01N 2009/006;
(Continued)

(56) References Cited

U.S. PATENT DOCUMENTS

| | | | | |
|---|---|---|---|---|
| 5,966,983 A | * | 10/1999 | Pfeiffer | G01F 23/2961 73/291 |
| 2009/0174286 A1 | * | 7/2009 | Yoshimatsu | H03H 9/0595 310/321 |
| 2010/0030486 A1 | * | 2/2010 | Lopatin | G01L 9/0022 702/54 |

FOREIGN PATENT DOCUMENTS

| DE | 10057974 A1 | 11/2000 |
|---|---|---|
| DE | 10050299 A1 | 4/2002 |

(Continued)

*Primary Examiner* — Tarun Sinha
(74) *Attorney, Agent, or Firm* — Kelly J. Smith; Endress+Hauser (USA) Holding, Inc.

(57) ABSTRACT

A device and a method for measuring and/or monitoring at least one process variable of a medium is provided. The device comprises a sensor unit with a mechanically vibrating unit, at least one reflection unit, a piezoelectric element which is attached to the membrane, and an electronic. The device is designed to excite the mechanically vibrating unit to mechanical vibrations using an excitation signal, to receive the mechanical vibrations of the vibrating unit and convert them into a first reception signal, to emit a transmission signal, and to receive a second reception signal. The electronic unit is designed to determine the at least one process variable of the medium based on the first and/or second reception signal.

5 Claims, 2 Drawing Sheets

(51) Int. Cl.
    *G01K 7/02*     (2021.01)
    *G01K 7/16*     (2006.01)
    *G01N 9/00*     (2006.01)
    *G01N 29/024*     (2006.01)
    *G01N 29/24*     (2006.01)
    *G01N 29/44*     (2006.01)

(52) U.S. Cl.
    CPC ............... *G01K 7/16* (2013.01); *G01N 9/002* (2013.01); *G01N 29/2437* (2013.01); *G01N 29/4436* (2013.01); *G01N 2009/006* (2013.01); *G01N 2291/02809* (2013.01); *G01N 2291/02818* (2013.01)

(58) Field of Classification Search
    CPC .......... G01N 2291/02809; G01N 2291/02818; G01N 2291/02836; G01N 2291/045; G01N 11/16; G01N 29/222; G01F 23/296; G01K 7/02; G01K 7/16

See application file for complete search history.

(56) References Cited

FOREIGN PATENT DOCUMENTS

| | | |
|---|---|---|
| DE | 10350086 A1 | 6/2005 |
| DE | 102004011377 A1 | 9/2005 |
| DE | 102005015547 A1 | 10/2006 |
| DE | 102006033819 A1 | 1/2008 |
| DE | 102006034105 A1 | 1/2008 |
| DE | 102007013557 A1 | 2/2008 |
| DE | 102007043811 A1 | 3/2009 |
| DE | 102009026685 A1 | 12/2010 |
| DE | 102009028022 A1 | 2/2011 |
| DE | 102010030982 A1 | 1/2012 |
| DE | 102012100728 A1 | 8/2013 |
| DE | 102012014199 A1 | 2/2014 |
| DE | 102015102834 A1 | 9/2016 |
| DE | 102015112055 A1 | 1/2017 |
| DE | 102015122661 A1 | 6/2017 |
| DE | 102016112743 A1 | 1/2018 |
| DE | 102017130527 A1 | 6/2019 |
| EP | 0903563 A1 | 3/1999 |
| WO | 2018198820 A1 | 11/2018 |
| WO | 2020094266 A1 | 5/2020 |

\* cited by examiner

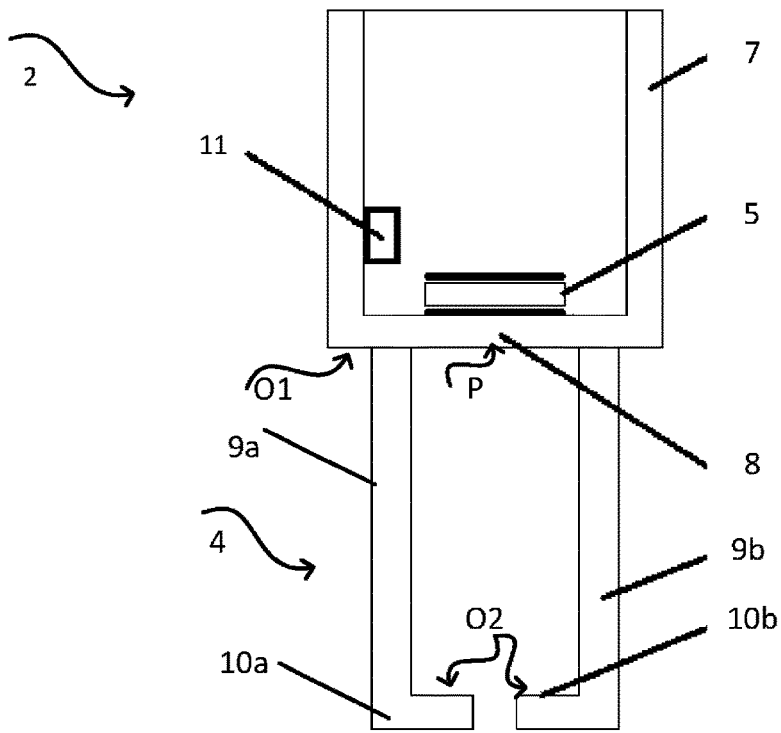
Fig. 2a
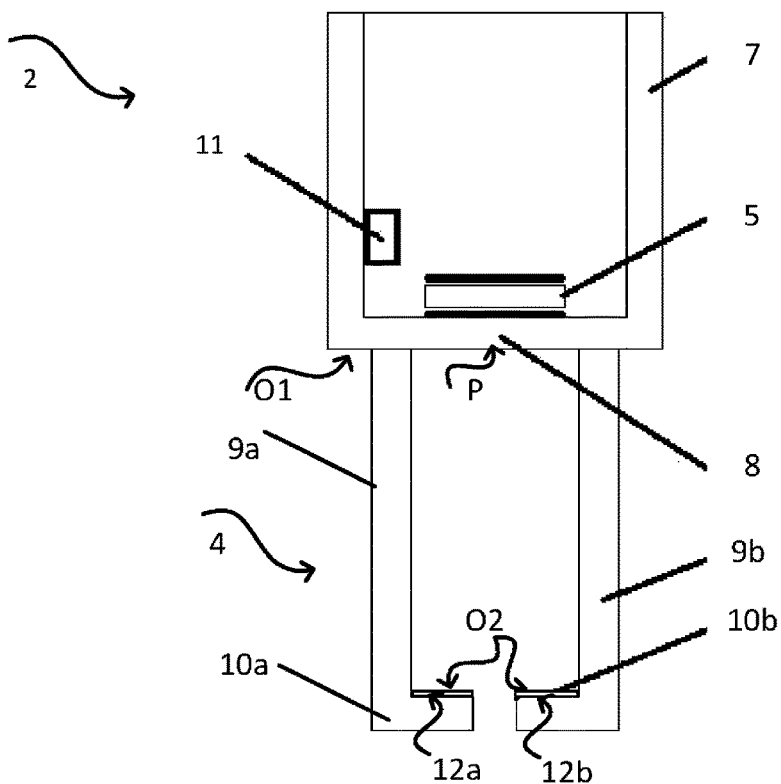
Fig. 2b
Fig. 2

VIBRONIC MULITSENSOR

CROSS-REFERENCE TO RELATED APPLICATIONS

The present application is related to and claims the priority benefit of DPMA Patent Application No. 10 2020 105 214.6, filed on Feb. 27, 2020, and International Patent Application No. PCT/EP2021/052001, filed on Jan. 28, 2021, the entire contents of which are incorporated herein by reference.

TECHNICAL FIELD

The invention relates to a device for measuring and/or monitoring at least one process variable of a medium, comprising a sensor unit with a mechanically vibrating unit and with an electronic unit. The present invention further relates to a method for measuring and/or monitoring the at least one process variable of the medium. The medium is located in a container, e.g., in a reservoir or in a pipeline.

BACKGROUND

Vibronic sensors are often used in process and/or automation engineering. In the instance of fill level measuring devices, they have at least one mechanically vibrating unit such as, for example, a vibrating fork, a single rod, or a membrane. In operation, this is excited to mechanical vibrations by means of a driving/receiving unit, often in the form of an electromechanical transducer unit, which in turn can be a piezoelectric drive or an electromagnetic drive, for example. A wide variety of corresponding field devices are produced by the applicant and are distributed under the name LIQUIPHANT or SOLIPHANT, for example. The underlying measurement principles are known in principle from numerous publications. The driving/receiving unit excites the mechanically vibrating unit to mechanical vibrations by means of an electrical excitation signal. Conversely, the driving/receiving unit can receive the mechanical vibration of the mechanically vibrating unit and transduce these into an electrical reception signal. The driving/receiving unit is accordingly either a separate driving unit and a separate receiving unit, or a combined driving/receiving unit.

In many instances, the driving/receiving unit is thereby part of a feedback electrical resonant circuit by means of which the excitation of the mechanically vibrating unit to mechanical vibrations takes place. For example, for a resonant vibration, the resonant circuit condition must be fulfilled according to which the amplification factor is M and all phases occurring in the resonant circuit result in a multiple of 360°. To excite and fulfill the resonant circuit condition, a defined phase shift between the excitation signal and the reception signal must be ensured. A specifiable value for the phase shift, i.e., a target value for the phase shift between the excitation signal and the reception signal, is therefore frequently set. For this purpose, various solutions, both analog and digital methods, have become known from the prior art, as described, for example, in documents DE102006034105A1, DE102007013557A1, DE102005015547A1, DE102009026685A1, DE102009028022A1, DE102010030982A1, or DE00102010030982A1.

Both the excitation signal and the reception signal are characterized by their frequency $\omega$, amplitude A, and/or phase $\Phi$. Accordingly, changes in these variables are typically used to measure the respective process variable. The process variable can, for example, be a fill level, a specified fill level, or the density or the viscosity of the medium, and also the flow rate. Given a vibronic level switch for liquids, for example, a distinction is made between whether the vibrating unit is covered by the liquid or vibrates freely. These two states—the free state and the covered state—are differentiated, for example, using different resonant frequencies, i.e. using a frequency shift.

The density and/or viscosity can in turn only be determined with such a measuring device if the vibrating unit is completely covered by the medium. In conjunction with the measurement of the density and/or viscosity, different possibilities have likewise become known from the prior art, such as those disclosed in the documents DE10050299A1, DE102007043811A1, DE10057974A1, DE102006033819A1, DE102015102834A1, or DE102016112743A1.

With a vibronic sensor, a plurality of process variables can be measured accordingly and be used for characterizing the respective process. In many instances, however, further information about the process, especially knowledge of further physical and/or chemical process variables and/or process parameters, is required for comprehensive process monitoring and/or control. This can be achieved, for example, by integrating further field devices into the respective process. The measured values provided by the various measuring devices can then be further processed in a suitable manner in a unit superordinate to the devices.

Thus, a vibronic multisensor has become known from the previously unpublished international patent application with the file number PCT/EP2019/064724, which vibronic multisensor combines two measurement principles—the vibronic measurement principle and the ultrasonic measurement principle—in a single device. The sensor unit carries out mechanical vibrations on the one hand; in addition, a transmission signal is emitted. In response to the mechanical vibrations and to the transmission signal, two reception signals are received and evaluated with regard to at least two different process variables. The two reception signals can advantageously be evaluated independently of one another.

SUMMARY

Starting from the cited prior art, the object of the present invention is to simplify the design of such a multi-sensor.

This object is achieved by the device and by the method according to the present disclosure.

With regard to the device, the object is achieved by a device for measuring and/or monitoring at least one process variable of a medium, comprising a sensor unit with a mechanically vibrating unit, at least one reflection unit, and a piezoelectric element which is attached to the membrane, and an electronic unit. The device is designed to excite the mechanically vibrating unit to mechanical vibrations by means of an excitation signal, to receive mechanical vibrations of the vibrating unit and convert them into a first reception signal, to emit a transmission signal, and to receive a second reception signal; and the electronic unit is designed to measure the at least one process variable of the medium using the first and/or second reception signal.

The at least one piezoelectric element serves on the one hand as a driving/receiving unit for generating the mechanical vibrations of the mechanically vibrating unit by means of the excitation signal. In the event that the vibrating unit is covered by medium, these mechanical vibrations are influenced by the properties of the medium, so that a conclusion about a process variable can be generated using the first reception signal representing the vibrations of the vibrating unit.

However, the piezoelectric element, on the other hand, also serves to generate a transmission signal which is received in the form of the second reception signal. The transmission signal is especially an acoustic signal. If, on its way, the transmission signal passes through the medium at least temporarily and in segments, it is likewise influenced by the physical and/or chemical properties of the medium and can be used accordingly for measuring a process variable of the medium.

It is thus possible, within the scope of the present invention, to implement at least two measurement principles in a single device. On the one hand, the sensor unit executes mechanical vibrations in response to the excitation signal; in addition, a transmission signal is emitted. One or more, preferably two different, process variables can then be measured using the two separately evaluable reception signals. The possibilities in the measurement of process variables correspond to those described in the previously unpublished international patent application with the file number PCT/EP2019/064724, to which patent application full reference is made within the scope of the present application.

The multi-sensor according to the invention can advantageously be realized with a single piezoelectric element. This reduces the number of electrical supply lines that are necessary. The result is a cost-effective sensor which meets elevated safety requirements, ensures a high degree of reliability, and covers a wide application range.

In one embodiment of the device, the reflection units are designed to reflect the transmission signal back to the piezoelectric element. The transmission signal thus arrives from the piezoelectric element to the reflection unit and is reflected at the latter. It is advantageous if the reflection unit is designed and/or arranged in such a way that it is situated opposite the piezoelectric element. The reflection unit can also be arranged in the region of the vibrating unit but separate therefrom. The reflection unit is preferably adapted to a selected embodiment for the vibrating unit.

A further embodiment includes that the device comprises a unit for measuring and/or monitoring a temperature of the medium, wherein the unit for measuring and/or monitoring the temperature especially comprises a temperature sensor in the form of a resistor element or a thermocouple. In this context, reference is made to the previously unpublished German patent application 102019116150.9, in which numerous possible embodiments for such a multi-sensor with temperature measuring unit are indicated, and to which reference is likewise made in full within the scope of the present application.

The unit is preferably arranged in a housing of the device, which housing terminates in an end region with the membrane. In this way, a good thermal coupling to the process can be achieved.

As an alternative to a separate unit for temperature measurement, it is likewise possible to perform a monitoring of the temperature of the medium by means of the piezoelectric element, since the capacitance of a piezoelectric element is in principle temperature-dependent. In this instance, a separate device for measuring the temperature would not be necessary.

The mechanically vibrating unit is, for example, a membrane, a single rod, or an arrangement of a membrane with at least two vibrating elements integrally formed thereon, especially a tuning fork. Depending on the embodiment of the sensor unit, the transmission of the transmission signal in the form of an ultrasound signal, like the excitation signal, can also lead to a mechanical vibration in the region of the sensor unit, especially to mechanical vibrations of the membrane. However, these first vibrations, caused by the transmission signal, relate to second vibrations to be distinguished from the vibrations caused by the excitation signal, especially are two different vibration modes, and/or they relate to different components of the sensor unit; for example, the transmission signal relates to the membrane and the excitation signal relates to the vibrating elements. It is therefore an advantage of the present invention that, given simultaneous reduction of the necessary components, it is nevertheless possible to ensure that, irrespective of the embodiment of the vibrating unit, the transmission signal does not influence the evaluation of the first reception signal detected in response to the excitation signal. Conversely, the excitation signal also has no influence on the excitation signal.

In one embodiment of the device, the mechanically vibrating unit has a membrane and two vibrating rods integrally formed on the membrane, wherein the reflection unit is oriented, at least in segments, perpendicular to the vibrating rods, and wherein the piezoelectric element is attached to the membrane in a region of the membrane facing away from the vibrating rods.

It is advantageous if at least two reflection units are present, which are respectively integrally formed on the vibrating rods in an end region facing away from the membrane. In this instance, the transmission signal is emitted starting from the piezoelectric element attached to the membrane and runs along a path parallel to the vibrating rods to the reflection units, and from there back to the piezoelectric element. This arrangement results in a comparatively long route for the transmission signal. Due to this comparatively long route, a high measurement accuracy can be achieved with such a design.

It is further advantageous if the reflection units are designed to be cuboid, wherein a respective surface of each of the reflection units is oriented parallel to a surface of the membrane facing toward the process. In this instance, the transmission signal is reflected at the surface of the reflection units oriented parallel to the surface of the membrane.

It is likewise advantageous if the reflection units are oriented facing toward one another, starting from the vibrating rods. The reflection units preferably run radially inward, starting from the respective vibration rod, relative to a center point of the surface of the membrane facing toward the process.

A respective reflective coating is preferably applied to the reflection units, at least in the region of a surface facing toward the membrane. The reflective coating especially comprises a material with high acoustic impedance, preferably with an acoustic impedance that is greater than that of the medium. For example, the vibrating unit can be made of a plastic and the coating can be made of a metal, such as stainless steel, bronze, or aluminum. It is advantageous if an abrupt change in the acoustic impedance occurs in the region of the vibrating unit.

It is thus not necessary to form the reflection units entirely from a reflective material. Rather, the material for producing the reflection units can be adapted to the vibration rods. Rather, a reflective coating is sufficient which is preferably applied to at least a partial region of the surface of the reflective units facing toward the surface of the membrane facing the process.

Finally, it is advantageous if a sum of the two surfaces of the two reflection units, said two surfaces facing toward the membrane, is at least 20% of the surface of the membrane and/or of the piezoelectric element facing toward the process. The piezoelectric element preferably has a cross-section that is smaller than or equal to the diameter of the surface of the membrane facing toward the process. In this way, a sufficient reflection and a sufficient signal-to-noise ratio can be achieved.

It is likewise possible to also provide the device with a unit for measuring and/or monitoring a pressure, and/or a unit for measuring and/or monitoring a conductivity and/or capacitance of the medium. By implementing additional measurement principles in a single sensor, the application range and the measurement accuracy, availability, and/or reliability of the sensor can be further broadened or increased.

The object on which the invention is based is further achieved by a method for measuring and/or monitoring at least one process variable of a medium by means of a device according to the invention according to at least one of the described embodiments, wherein a sensor unit is excited to vibrate mechanically by means of an excitation signal,
the mechanical vibrations are received by the sensor unit and converted into a first reception signal,
the sensor unit emits a transmission signal and receives a second reception signal, and
the at least one process variable is determined using the first and/or second reception signal.

On the one hand, it is conceivable that the excitation signal and the transmission signal are simultaneously supplied to the sensor unit, wherein the excitation signal and the transmission signal are superimposed on one another. Alternatively, however, the excitation signal and the transmission signal can also be alternately supplied to the sensor unit.

The excitation signal is, for example, an electrical signal having at least one predeterminable frequency, especially a sinusoidal or a rectangular-wave signal. The mechanically vibrating unit, which is part of the sensor unit, is preferably at least temporarily excited to resonant vibrations. The mechanical vibrations are influenced by the medium surrounding the vibrating unit, so that conclusions regarding various properties of the medium are possible using a reception signal representing the vibrations.

The transmission signal is preferably an ultrasound signal, especially a pulsed ultrasound signal, especially at least one ultrasound pulse. An ultrasound-based measurement, especially according to the transit time principle, is accordingly performed within the scope of the present invention as a second applied measurement method. The transmission signal emitted in each instance at least partially passes through the medium and is influenced by the latter in its properties. Accordingly, conclusions regarding various media can likewise be drawn using the respectively received second reception signal.

With the method according to the invention, a plurality of different process variables can be determined by means of different measurement principles. Different process variables can advantageously be measured independently of one another, so that a comprehensive analysis of the respective process is made possible by means of a single measuring device. In that the same sensor unit is used for a plurality of measurement methods, the accuracy and/or reliability of the measurements can moreover be markedly increased. Moreover, a state monitoring of the device may be performed using the various measurement principles. Numerous embodiments are possible in this regard for the method according to the invention, of which some preferred variants are specified below.

One embodiment of the method includes that the temperature of the medium is measured. In this regard, it is advantageous if an influence of the temperature of the medium on at least the first and/or second reception signal, or at least one process variable derived from a reception signal, is compensated for.

Another embodiment includes that the at least two different process variables are determined, wherein a first process variable is determined using the first reception signal, and wherein a second process variable is determined using the second reception signal.

A further particularly preferred embodiment includes that at least one process variable is a predeterminable fill level, density, viscosity, sound velocity, or a variable derived from at least one of these variables. Particularly preferably, the density of the medium is thus measured using the first reception signal, and the sound velocity within the medium is thus measured using the second reception signal. However, it is implicitly understood that, in addition to the process variables explicitly mentioned here, further process variables and/or process parameters which are accessible by means of the two performed measurements can likewise be measured and used for characterizing the respective process.

In yet another particularly preferred embodiment, a first concentration of a first substance contained in the medium and a second concentration of a second substance contained in the medium are determined using the first and second reception signals and/or using the first and second process variables. According to the prior art, for such an analysis of the medium with respect to two different substances, two separate measuring devices that provide different measurands are usually required. According to the invention, by contrast, a statement about two different components in a medium can be reliably made by means of a single device.

Finally, an advantageous embodiment of the method includes that, using the first and second reception signals and/or using the first and second process variables, it is determined whether a deposit has been formed on the sensor unit and/or whether a drift and/or aging of the sensor unit is present. The two reception signals are typically respectively different depending on a deposit on the probe unit, a drift, or an aging in the region of the sensor unit. The presence of a deposit, a drift, or an aging can accordingly be determined, for example, using a temporal consideration of the two reception signals and/or process variables. In addition to an improved measurement accuracy, a possibility for predictive maintenance can thus be provided.

It should be pointed out that the embodiments described in connection with the device according to the invention can also be applied mutatis mutandis to the method according to the invention, and vice versa.

BRIEF DESCRIPTION OF THE DRAWINGS

The invention is explained in greater detail with reference to the following Figures. The following is shown:

FIG. 2 shows exemplary embodiments of a device according to the present disclosure.

DETAILED DESCRIPTION

Figure 1:
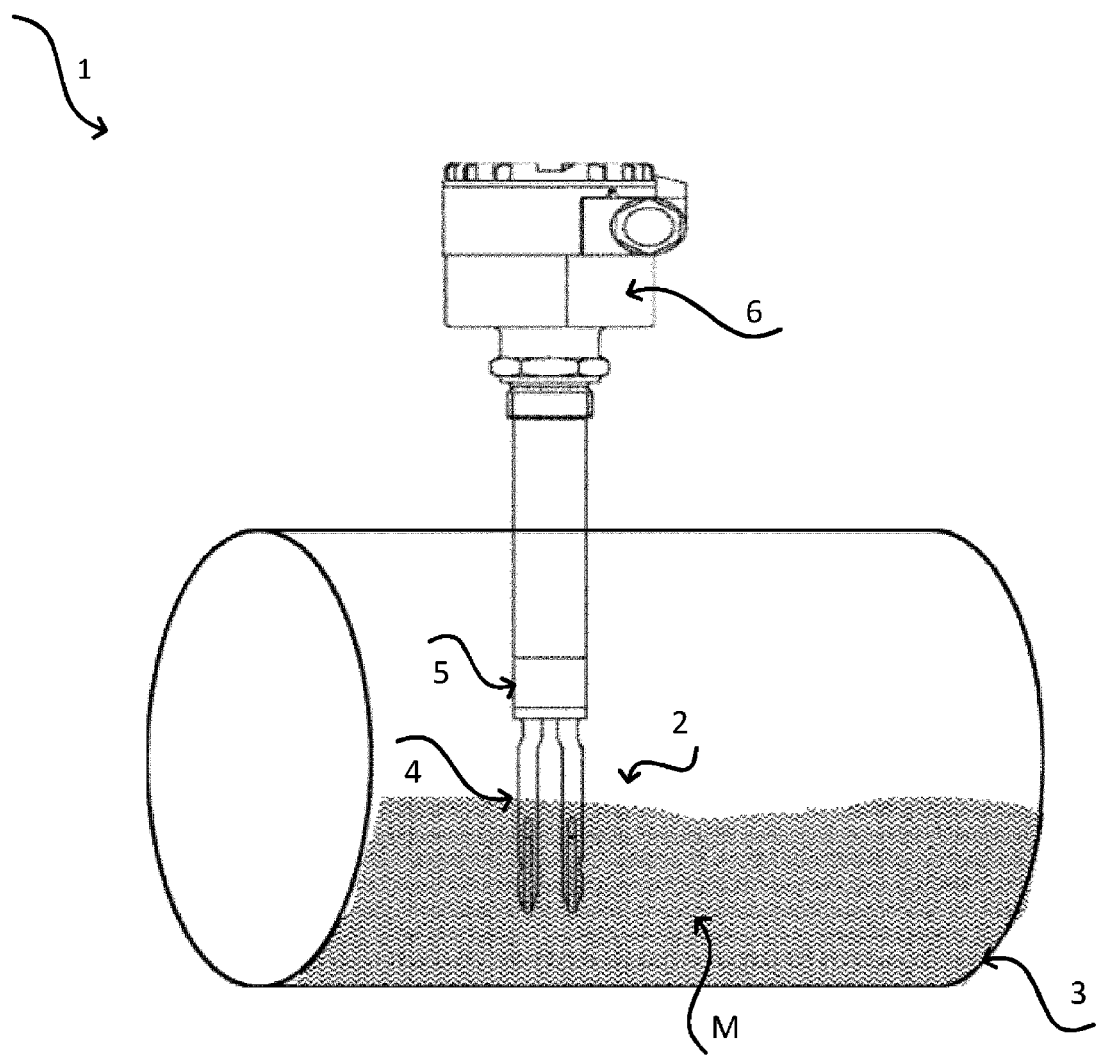
FIG. 1 shows a schematic drawing of a vibronic sensor according to the prior art.

In Figures, identical elements are respectively provided with the same reference signs.

FIG. 1 shows a vibronic sensor 1 having a sensor unit 2. The sensor has a mechanically vibrating unit 4 in the form of a tuning fork, which is partially immersed into a medium M which is located in a reservoir 3. The vibrating unit 4 is excited by the excitation/receiving unit 5 to mechanical vibrations and can, for example, be excited by means of a piezoelectric stack drive or biomorphic drive. Other vibronic sensors have, for example, electromagnetic driving/receiving units 5. It is possible to use a single driving/receiving unit 5, which serves to excite the mechanical vibrations and to detect them. However, it is also conceivable to implement one each, a driving unit and a receiving unit. FIG. 1 furthermore shows an electronic unit 6, by means of which the signal acquisition, evaluation and/or feeding takes place.

FIG. 2 shows exemplary embodiments of a sensor unit 2 according to the invention, in the form of vibrating forks. However, the present invention is in no way limited to such an embodiment of the vibrating unit 4. The mechanically vibrating unit 4 shown in FIG. 2a comprises two vibrating rods 9a, 9b, which are mounted on a membrane 8 and which are therefore also referred to as fork prongs. The membrane 8 is part of a housing 7 of the sensor 1 in which, for example, the electronic unit 6 (not shown here) can be arranged. In the present instance, the housing 7 terminates with the membrane 8 in a region facing toward the medium M. The driving/receiving unit 5 is designed in the form of a piezoelectric element which is attached to the membrane 8 in the region facing away from the medium M. The piezoelectric element 5 is thus located within the housing 7. A respective reflection unit 10, 10b is integrally formed in the end regions of the vibration rods 9a, 9b facing away from the membrane 8, said reflection unit respectively being arranged perpendicular to the respective vibration rod 9a, 9b. Both reflection units 10, 10b are designed to be cuboid for the shown embodiment and run radially inward, starting from the vibration rods 9a, 9b, relative to a center point P of the surface O1 of the membrane 8, said surface O1 facing toward the medium M.

The reflection units 10a, 10b are arranged such that a surface O2 of each of the two reflection units 10a, 10b runs parallel to the surface O1 of the membrane 8, said surface O1 facing toward the medium M.

The shown sensor unit 2 also has a unit 11 for measuring and/or monitoring the temperature T of the medium M, which unit is likewise arranged within the housing 7. This can, for example, comprise a temperature sensor in the form of a resistor element or a thermocouple.

For the embodiment shown in FIG. 2a, both reflection units 10a, 10b are made of a reflective material, for example a metal. This is advantageous especially in the event of a metallic vibrating unit 4.

An alternative embodiment is shown in FIG. 2b. In contrast to the embodiment shown in FIG. 2a, a reflective, preferably metallic coating 12a, 12b is applied onto each of the two reflection units 10a, 10b in the region of the surface O2 facing toward the membrane 8. In this instance, the reflection units 10a, 10b may be made of any other material, preferably the same material as that used for the vibration rods 9a, 9b.

The invention claimed is:

1. A device for measuring or monitoring at least one process variable of a medium, comprising
   a sensor unit including:
      a mechanically vibrating unit;
      at least one reflection unit;
      a piezoelectric element which is attached to a membrane; and
      an electronic unit;
   wherein the device is designed to excite the mechanically vibrating unit to mechanical vibrations using an excitation signal;
   to receive the mechanical vibrations of the vibrating unit and convert them into a first reception signal;
   to transmit a transmission signal; and
   to receive a second reception signal;
   wherein the electronic unit is designed to determine the at least one process variable of the medium using the first or second reception signal,
   wherein the mechanically vibrating unit has the membrane and two vibrating rods integrally formed on the membrane, wherein the reflection unit is oriented, at least in segments, perpendicular to the vibrating rods, and
   wherein the piezoelectric element is attached to the membrane in a region of the membrane facing away from the vibrating rods;
   wherein at least two reflection units are present which are respectively integrally formed on the vibrating rods in an end region facing away from the membrane;
   wherein the reflection units are designed to be cuboid, wherein a respective surface of each of the reflection units is oriented parallel to a surface of the membrane, said surface facing toward the process
   wherein the reflection units are oriented in a manner facing toward one another, starting from the vibrating rods.

2. The device according to claim 1,
   wherein the reflection unit is designed to reflect the transmission signal back to the piezoelectric element.

3. The device according to claim 1,
   comprising a unit for measuring and or monitoring a temperature of the medium; wherein the unit for measuring or monitoring the temperature comprises a temperature sensor in the form of a resistor element or a thermocouple.

4. The device according to claim 1,
   wherein a respective reflective coating is applied to the reflection units, at least in the region of a surface facing toward the membrane.

5. The device according to claim 4,
   wherein a sum of the two surfaces of the two reflection units, said surface facing toward the membrane, is at least 20% of the surface of the membrane or of the piezoelectric element, the surface facing toward the process.

* * * * *